Feb. 11, 1964  F. E. ALTMAN ETAL  3,121,135
SIX ELEMENT OBJECTIVE
Filed Dec. 9, 1960

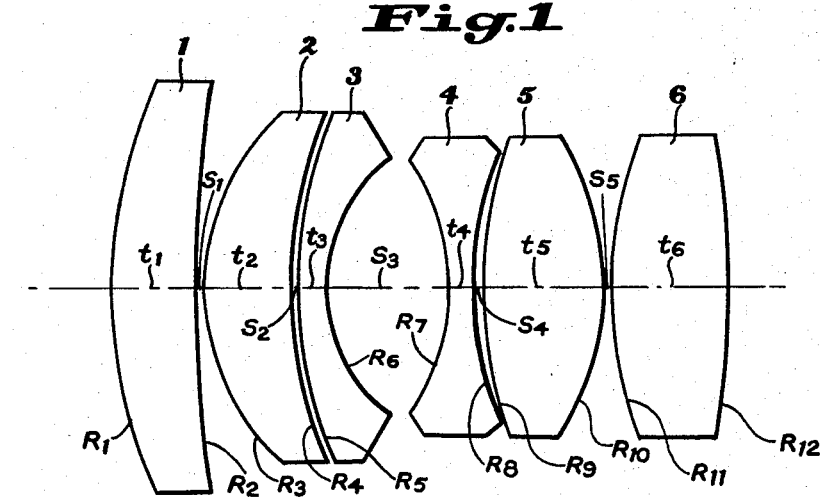

| EQUIVALENT FOCUS = 1 | | | | | $f/1.4$ |
|---|---|---|---|---|---|
| LENS | N | V | Radii | Spacings | Thicknesses |
| 1 | 1.73 | 51 | $R_1$=.832 | | $t_1$= .15 |
| | | | $R_2$=-4.92 | $S_1$=.02 | |
| 2 | 1.49 | 57 | $R_3$=4.03 | | $t_2$ = .16 |
| | | | $R_4$=.766 | $S_2$=.004 | |
| 3 | 1.59 | 31 | $R_5$=.766 | | $t_3$ =.055 |
| | | | $R_6$=.275 | $S_3$= .21 | |
| 4 | 1.59 | 31 | $R_7$=-.396 | | $t_4$ = .055 |
| | | | $R_8$= .736 | $S_4$=.002 | |
| 5 | 1.49 | 57 | $R_9$= .774 | | $t_5$ = .22 |
| | | | $R_{10}$=-.470 | $S_5$=.009 | |
| 6 | 1.70 | 56 | $R_{11}$= .744 | | $t_6$ = .21 |
| | | | $R_{12}$=-2.01 | | |

Fig.3

| EQUIVALENT FOCUS = 1 | | | | | $f/1.4$ |
|---|---|---|---|---|---|
| LENS | N | V | Radii | Spacings | Thicknesses |
| 1 | 1.73 | 51 | $R_1$=.829 | | $t_1$ = .15 |
| | | | $R_2$= 4.35 | $S_1$=.015 | |
| 2 | 1.49 | 57 | $R_3$=4.24 | | $t_2$ = .16 |
| | | | $R_4$= 1.66 | $S_2$=.004 | |
| 3 | 1.57 | 33 | $R_5$= 1.42 | | $t_3$ =.055 |
| | | | $R_6$=.282 | $S_3$=.211 | |
| 4 | 1.57 | 33 | $R_7$=-.373 | | $t_4$ =.055 |
| | | | $R_8$= .799 | $S_4$=.004 | |
| 5 | 1.49 | 57 | $R_9$= .883 | | $t_5$ = .22 |
| | | | $R_{10}$=-.452 | $S_5$ =.01 | |
| 6 | 1.70 | 56 | $R_{11}$=.772 | | $t_6$ = .21 |
| | | | $R_{12}$=-1.96 | | |

Fred E. Altman
Nicholas M. Pituley
INVENTORS
ATTORNEYS

United States Patent Office 3,121,135
Patented Feb. 11, 1964

3,121,135
SIX ELEMENT OBJECTIVE
Fred E. Altman and Nicholas M. Pituley, Rochester, N.Y., assignors to Eastman Kodak Company, Rochester, N.Y., a corporation of New Jersey
Filed Dec. 9, 1960, Ser. No. 74,810
2 Claims. (Cl. 88—57)

This invention relates to a photographic objective having six elements.

An object of the invention is to provide an objective having an unusually high degree of correction at a large aperture when used in a relatively short focal length, as for 8 mm. movie cameras, and wherein the use of plastic for certain of the lens elements is rendered feasible. This has not only economic advantages, but also the important advantages flowing from the combinations of indices of refraction and dispersive indices (Abbé numbers) available in plastic materials but not found in optical glasses.

According to the present invention, there is provided a six element lens comprised of two outer simple positive elements and two inner doublet components, each inner component having a positive and negative element. We have found that two inner components of the lens may be made of plastic materials, if these doublets are airspaced slightly, and still better results are obtained if the rear doublet contains an airspace having a slight negative power. Such an airspace is thicker at the axis than at the margins but has negative power because it is enclosed by materials having refractive indices greater than the refractive index of air. For best results the ratio of the radii of curvature of the two surfaces enclosing the airspace should lie between 1.02 and 1.12.

The above and other objects and advantages will be apparent from the following specification when read in conjunction with the attached drawing, in which:

FIG. 1 is a diagram of an objective incorporating our invention; and

FIGS. 2 and 3 are tables of constructional data for two embodiments of our invention.

As shown in FIG. 1, a lens according to our invention comprises positive glass elements 1 and 6, and two doublets, one composed of plastics elements 2 and 3 and the other composed of plastics elements 4 and 5. Elements 2 and 5 are positive and are made of the same plastic material. Elements 3 and 4 are negative and made from the same plastic material, one that has a higher refractive index and lower dispersive index than that used in elements 2 and 5.

The airspace of the present invention is the space enclosed by surfaces $R_8$ and $R_9$. $R_4$ and $R_5$ may have the same or different values. It is not critical to the present invention whether $R_4$ and $R_5$ are airspaced or cemented, but they are preferably airspaced as shown.

Two embodiments of the invention are described in FIGS. 2 and 3 which are repeated here for convenience.

*Table 1*

[Equivalent focus=1. f/1.4]

| Lens | N | V | Radii | Spacings | Thicknesses |
|---|---|---|---|---|---|
| 1 | 1.73 | 51 | $R_1 = .832$ |  | $t_1 = .15$ |
|  |  |  | $R_2 = 4.92$ | $S_1 = .02$ |  |
| 2 | 1.49 | 57 | $R_3 = .403$ |  | $t_2 = .16$ |
|  |  |  | $R_4 = .766$ | $S_2 = .004$ |  |
| 3 | 1.59 | 31 | $R_5 = .766$ |  | $t_3 = .055$ |
|  |  |  | $R_6 = .275$ | $S_3 = .21$ |  |
| 4 | 1.59 | 31 | $R_7 = -.396$ |  | $t_4 = .055$ |
|  |  |  | $R_8 = .736$ | $S_4 = .002$ |  |
| 5 | 1.49 | 57 | $R_9 = .774$ |  | $t_5 = .22$ |
|  |  |  | $R_{10} = -.470$ | $S_5 = .009$ |  |
| 6 | 1.70 | 56 | $R_{11} = .744$ |  | $t_6 = .21$ |
|  |  |  | $R_{12} = -2.01$ |  |  |

*Table 2*

[Equivalent Focus=1. f/1.4]

| Lens | N | V | Radii | Spacings | Thicknesses |
|---|---|---|---|---|---|
| 1 | 1.73 | 51 | $R_1 = .829$ |  | $t_1 = .15$ |
|  |  |  | $R_2 = 4.35$ | $S_1 = .015$ |  |
| 2 | 1.49 | 57 | $R_3 = .424$ |  | $t_2 = .16$ |
|  |  |  | $R_4 = 1.66$ | $S_2 = .004$ |  |
| 3 | 1.57 | 33 | $R_5 = 1.42$ |  | $t_3 = .055$ |
|  |  |  | $R_6 = .282$ | $S_3 = .21$ |  |
| 4 | 1.57 | 33 | $R_7 = -.373$ |  | $t_4 = .055$ |
|  |  |  | $R_8 = .799$ | $S_4 = .004$ |  |
| 5 | 1.49 | 57 | $R_9 = .883$ |  | $t_5 = .22$ |
|  |  |  | $R_{10} = -.452$ | $S_5 = .01$ |  |
| 6 | 1.70 | 56 | $R_{11} = .772$ |  | $t_6 = .21$ |
|  |  |  | $R_{12} = -1.96$ |  |  |

In the figures, and in the tables, the values of R, the radii of curvature of the refracting surfaces, are given in terms of the focal length F, which in practical application will be from ½ inch to 1½ inches. The element spacings S and thicknesses t are also given in terms of F. The column labelled N gives the indices of refraction for the D line of the spectrum, and the column V gives the dispersive index (Abbé number) for the materials chosen.

In both embodiments, elements 1 and 6 are of optical glass, and elements 2 and 5 are of a polymethylmethacrylate resin having the stated index and Abbé number. Plexiglas V-100 is one trade name for such a resin.

In the embodiment of FIG. 2 and Table 1, lenses 3 and 4 are made of polystyrene having the stated index and Abbé number. In the embodiment of FIG. 3 and Table 2, lenses 3 and 4 are made of a copolymer of styrene and acrylonitrile blended in such proportions (about 6 parts styrene and 4 parts acrylonitrile) as to have the desired optical properties as shown in the table. The copolymer has the advantage over pure polystyrene of being easier to mold.

It will be observed that in the example of FIG. 2, $$\frac{R_9}{R_8} = 1.05$$

and in the example of FIG. 3, $$\frac{R_9}{R_8} = 1.11$$

The specific embodiments discussed above, of course, are not the only possible embodiments of the invention which will produce a good objective. In general, each radius of curvature and index of refraction may be varied between certain limits within the inventive concept disclosed herein to produce a lens having specific properties as desired. We have found that appropriate limiting values for the practice of our invention are as set out in the following table:

Table 3

$$0.75F < R_1 < 1.00F$$
$$3.0F < R_2 < 6.0F$$
$$0.3F < R_3 < 0.5F$$
$$0.6F < R_4 < 1.8F$$
$$0.6F < R_5 < 1.8F$$
$$0.2F < R_6 < 0.3F$$
$$-0.5F < R_7 < -0.3F$$
$$0.5F < R_8 < R_9 < 1.0F$$
$$-0.5F < R_{10} < -0.3F$$
$$0.6F < R_{11} < 0.85F$$
$$-2.5F < R_{12} < -1.5F$$
$$N_1 > 1.7$$
$$N_2 = N_5 < 1.5$$
$$N_3 = N_4 < 1.6$$
$$N_6 > 1.65$$

and in which the ratio of $R_9$ to $R_8$ is within the limits $$1.02 < \frac{R_9}{R_8} < 1.12$$

where the subscripts refer to refracting surfaces numbered in order from front to rear, N is the index of refraction for the D-line and F is the equivalent focal length of the objective.

The invention has been described in detail with particular reference to preferred embodiments thereof, but it will be understood that variations and modifications can be effected within the spirit and scope of the invention as described hereinabove and as defined in the appended claims.

We claim:

1. A photographic objective of glass and plastic materials comprising six elements and having substantially the following characteristics:

| Lens | N | V | Radii | Spacings | Thicknesses |
|---|---|---|---|---|---|
| 1 | 1.73 | 51 | $R_1 = .832F$ | | $t_1 = .15F$ |
|   |      |    | $R_2 = 4.92F$ | $S_1 = .02F$ | |
| 2 | 1.49 | 57 | $R_3 = .403F$ | | $t_2 = .16F$ |
|   |      |    | $R_4 = .766F$ | $S_2 = .004F$ | |
| 3 | 1.59 | 31 | $R_5 = .766F$ | | $t_3 = .055F$ |
|   |      |    | $R_6 = .275F$ | $S_3 = .21F$ | |
| 4 | 1.59 | 31 | $R_7 = -.396F$ | | $t_4 = .055F$ |
|   |      |    | $R_8 = .736F$ | $S_4 = .002F$ | |
| 5 | 1.49 | 57 | $R_9 = .774F$ | | $t_5 = .22F$ |
|   |      |    | $R_{10} = -.470F$ | $S_5 = .009F$ | |
| 6 | 1.70 | 56 | $R_{11} = .744F$ | | $t_6 = .21F$ |
|   |      |    | $R_{12} = -2.01F$ | | | where the lens elements are numbered from front to rear, N is the index of refraction for the D-line, V is the dispersive index, R gives the radii of curvature of the refracting surfaces, numbered from front to rear, S gives the element spacings, numbered from front to rear, $t$ gives the element thicknesses, numbered from front to rear, F is the focal length of the objective and where radii without sign are convex toward the front and radii with a negative sign are concave toward the front.

2. A photographic objective of glass and plastic materials comprising six elements and having substantially the following characteristics:

| Lens | N | V | Radii | Spacings | Thicknesses |
|---|---|---|---|---|---|
| 1 | 1.73 | 51 | $R_1 = .829F$ | | $t_1 = .15F$ |
|   |      |    | $R_2 = 4.35F$ | $S_1 = .015F$ | |
| 2 | 1.49 | 57 | $R_3 = .424F$ | | $t_2 = .16F$ |
|   |      |    | $R_4 = 1.66F$ | $S_2 = .004F$ | |
| 3 | 1.57 | 33 | $R_5 = 1.42F$ | | $t_3 = .055F$ |
|   |      |    | $R_6 = .282F$ | $S_3 = .21F$ | |
| 4 | 1.57 | 33 | $R_7 = -.373F$ | | $t_4 = .055F$ |
|   |      |    | $R_8 = .799F$ | $S_4 = .004F$ | |
| 5 | 1.49 | 57 | $R_9 = .883F$ | | $t_5 = .22F$ |
|   |      |    | $R_{10} = -.452F$ | $S_5 = .01F$ | |
| 6 | 1.70 | 56 | $R_{11} = .772F$ | | $t_6 = .21F$ |
|   |      |    | $R_{12} = -1.96F$ | | | where the lens elements are numbered from front to rear, N is the index of refraction for the D-line, V is the dispersive index, R gives the radii of curvature of the refracting surfaces, numbered from front to rear, S gives the element spacings, numbered from front to rear, $t$ gives the element thicknesses, numbered from front to rear, F is the focal length of the objective and where radii without sign are convex toward the front and radii with a negative sign are concave toward the front.

References Cited in the file of this patent

UNITED STATES PATENTS

| 2,405,301 | Grey | Aug. 6, 1946 |
| 2,430,550 | Altman et al. | Nov. 11, 1947 |
| 2,997,921 | Lynch et al. | Aug. 29, 1961 |

FOREIGN PATENTS

| 427,008 | Great Britain | Apr. 12, 1935 |
| 490,381 | Great Britain | Aug. 15, 1938 |
| 561,503 | Great Britain | May 23, 1944 |